(12) United States Patent
Skull

(10) Patent No.: US 7,133,999 B2
(45) Date of Patent: Nov. 7, 2006

(54) METHOD AND SYSTEM FOR LOCAL MEMORY ADDRESSING IN SINGLE INSTRUCTION, MULTIPLE DATA COMPUTER SYSTEM

(75) Inventor: Jon Skull, Surrey (GB)

(73) Assignee: Micron Technology, Inc., Boise, ID (US)

( * ) Notice: Subject to any disclaimer, the term of this patent is extended or adjusted under 35 U.S.C. 154(b) by 496 days.

(21) Appl. No.: 10/171,049

(22) Filed: Jun. 12, 2002

(65) Prior Publication Data

US 2003/0191922 A1    Oct. 9, 2003

(51) Int. Cl.
*G06F 15/00* (2006.01)
(52) U.S. Cl. .......................................... 712/22
(58) Field of Classification Search ............... 711/200, 711/202, 211; 712/22; 345/571
See application file for complete search history.

(56) References Cited

U.S. PATENT DOCUMENTS

| | | | | |
|---|---|---|---|---|
| 4,769,696 A | * | 9/1988 | Utsuda et al. | 358/527 |
| 5,394,553 A | | 2/1995 | Lee | 395/800 |
| 5,634,034 A | * | 5/1997 | Foster | 711/147 |
| 5,926,644 A | | 7/1999 | Hays | 712/22 |
| 5,943,283 A | * | 8/1999 | Wong et al. | 365/230.01 |
| RE37,103 E | * | 3/2001 | Katsura et al. | 345/545 |
| 6,304,958 B1 | | 10/2001 | Kiuchi et al. | 712/229 |
| 6,338,154 B1 | * | 1/2002 | Kim | 714/743 |

FOREIGN PATENT DOCUMENTS

| | | |
|---|---|---|
| EP | 0375401 A1 | 6/1990 |
| EP | 0544127 A2 | 6/1993 |
| EP | 0831493 A2 * | 3/1998 |

OTHER PUBLICATIONS

D.W. Blevins et al, "BLITZEN: A Highly Integrated Massively Parallel Machine," Proceedings of the 2nd Symposium on the Frontiers of Massively Parallel Computation, Oct. 1988, pp. 399-406.*

* cited by examiner

*Primary Examiner*—Pierre Vital
(74) *Attorney, Agent, or Firm*—Dorsey & Whitney LLP

(57) ABSTRACT

A single instruction, multiple data ("SIMD") computer system includes a central control unit coupled to 256 processing elements ("PEs") and to 32 static random access memory ("SRAM") devices. Each group of eight PEs can access respective groups of eight columns in a respective SRAM device. Each PE includes a local column address register that can be loaded through a data bus of the respective PE. A local column address stored in the local column address register is applied to an AND gate, which selects either the local column address or a column address applied to the AND gate by the central control unit. As a result, the central control unit can globally access the SRAM device, or a specific one of the eight columns that can be accessed by each PE can be selected locally by the PE.

26 Claims, 5 Drawing Sheets

METHOD AND SYSTEM FOR LOCAL MEMORY ADDRESSING IN SINGLE INSTRUCTION, MULTIPLE DATA COMPUTER SYSTEM

TECHNICAL FIELD

The invention relates computer systems having multiple processors and a memory device, and, more particularly, to a method and system for allowing the memory device to be addressed either globally by a control unit or locally by each processor.

BACKGROUND OF THE INVENTION

The complexity of computer systems span the range from relatively simple systems having a single central processing unit ("CPU") to systems having many processors that may operate somewhat independently of each other. One conventional multiple processor computer system is known as a single instruction, multiple data ("SIMD") processor. In a SIMD processing system, multiple processors or processor elements ("PEs") simultaneously perform the same operation on different items of data. As a result, SIMD processing systems are particularly useful for processing graphic images since graphic image processing typically involves performing a large number of identical operations on data that may differ from each other.

The PEs in a SIMD processing system are generally coupled to a Central Control Unit that controls the operation of the PEs. The Central Control Unit generally transfers instructions defining the operations that will be performed by the PEs from a single program memory (not shown) into respective register files. The Central Control Unit also loads into the respective register file for each PE the data items that are to be operated on by the PE. Each PE can access its register file to read data, perform the operation on the data, and write results from the operation to the register file. The Central Control Unit can then read the results of all of the operations performed by the PEs by reading from all of the register files. Thus, the register files can be accessed by either the Central Control Unit or its respective PE.

Although separate register files can be provided for each PE, register files for multiple PEs can alternatively be implemented by a memory device, such as a static random access memory ("SRAM") device or a dynamic random access memory ("DRAM") device, that is shared by the PEs. In particular, a memory device having an array formed by rows and columns can be organized so that each PE receives data from a respective group of columns in the array. The Central Control Unit can write data to and read data from any location in the memory array, and each PE can write data to and read data from its respective group of columns in the memory array.

A typical SIMD processing system 10 is shown in FIG. 1. The processing system 10, which is being commercially developed under the code name "Yukon," includes a central control unit 14 coupled to an address bus 16 and a data bus 18. The address bus 16 and data bus 18 are coupled to 32 SRAM devices $20_1$–$20_{32}$. Each SRAM device 20 includes an array of memory cells (not shown), row and column decoders (not shown) for selecting rows and columns in the array based on respective row and column addresses, a data path (not shown) coupling the data bus 18 to the array, and a variety of other components. In the SRAM devices 20 proposed for use in the Yukon SIMD processing system 10, the array in each SRAM device 20 includes 8 rows of memory cells arranged in 64 columns, and each column can store one byte (8 bits) of data. Thus, each SRAM device 20 includes 4,096 memory cells. In practice, the Central Control Unit 14 includes a PE Control Unit (not shown) providing control and address signals to the SRAM device 20, and a Data Control Unit (not shown) controlling the flow of data to and from the SRAMs 20.

The SIMD processing system 10 also includes 256 PEs designated $PE_1$–$PE_{256}$, eight of which share a respective SRAM device 20. For example, $PE_1$–$PE_8$ share the SRAM device $20_1$. The PEs are coupled to their respective SRAMs 20 by respective data buses $40_1$–$40_{256}$ so that each PE can receive data from memory cells in one of a respective group 8 columns. For example, the $PE_1$ can access data stored in columns 0–7 of the SRAM $20_1$, $PE_8$ can access data stored in columns 56–63 of the SRAM $20_1$, and $PE_{256}$ can access data stored in columns 56–63 of the SRAM $20_{32}$. It will therefore be apparent that the SRAMs 20 are dual ported SRAMs since the Central Control Unit 14 can access the SRAMs 20 through data ports that are different from the data ports each of the PEs accesses the SRAMs 20.

The Central Control Unit 14 also includes a number of control signal lines that are coupled to the SRAMs 20 and the PEs, but these lines have been omitted from FIG. 1 in the interest of brevity and so as not to unduly obscure certain details about the SIMD computer system 10 shown in FIG. 1. In the Yukon system, these control lines control the operation of all of the PEs so all of the PEs perform the same function. However, in other SIMD computer systems, the PEs may access the same or different instructions from a program memory (not shown).

In operation, the Central Control Unit 14 writes data to specific locations in each of the SRAMs 20. Since the computer system 10 is a SIMD system, the PEs generally perform the same function, although the data stored in the SRAMs 20 for each PE often varies. The Central Control Unit 14 applies row addresses to the SRAM's to make available to the PEs the data that are operated on by the PEs. Each PE then produces a respective result, and this result is made available to an SRAM 20. The Central Control Unit 14 addresses the SRAMs 20 to write the result data from each of the PEs to memory cells in at least one of the respective groups of columns that are coupled to the PE. Finally, the Central Control Unit 14 reads the results data from the SRAMs 20. Thus, the SRAM provide both scratch pad storage for the PEs and a communications path between the PEs and the Central Control Unit 14.

Although the SIMD system 10 shown in FIG. 1 can significantly increase the speed at which certain repetitious operations can be performed, it requires almost complete parallelism of the operations performed by the PEs. In particular, although different data can be stored in the SRAMs 20, all of the PEs must receive data from the same locations in the SRAMs 20. Similarly, results data from all of the PEs must be stored in the same row location and same column location within a respective group of columns. A PE cannot receive data from or transfer data to different locations in the SRAMs depending upon the results of an operation performed by the PE. These limitations on the PEs' ability to access different locations in the SRAM 20 depending upon the results of an operation can seriously limit the usefulness and versatility of SIMD computer systems like the system 10 shown in FIG. 1.

There is therefore a need for a SIMD computer system that allows individual PEs to access data and instructions from different locations in a register file or memory device depending upon the results of operations performed by the PEs.

SUMMARY OF THE INVENTION

A single instruction, multiple data computer system includes a central control unit having an address bus. The central control unit includes an address bus to which global column information corresponding to a respective global column address is applied. Also included in the system is at least one memory device having a column selection port and an array of memory locations arranged in rows and columns. A plurality of processing elements are each coupled to memory cells in a respective group of columns of the array. A plurality of local column registers each have an input port coupled to a data bus of a respective processing element to receive and store local column information corresponding to a local column address. The local column information from each local column register is applied to a respective selection device that also receives the global column information from the central control unit. The selection device is operable to couple the global column information to the column selection port of the memory device in a global addressing mode, and is operable to couple the local column information to the column selection port of the memory device in a local addressing mode.

DETAILED DESCRIPTION OF THE INVENTION

Figure 2:
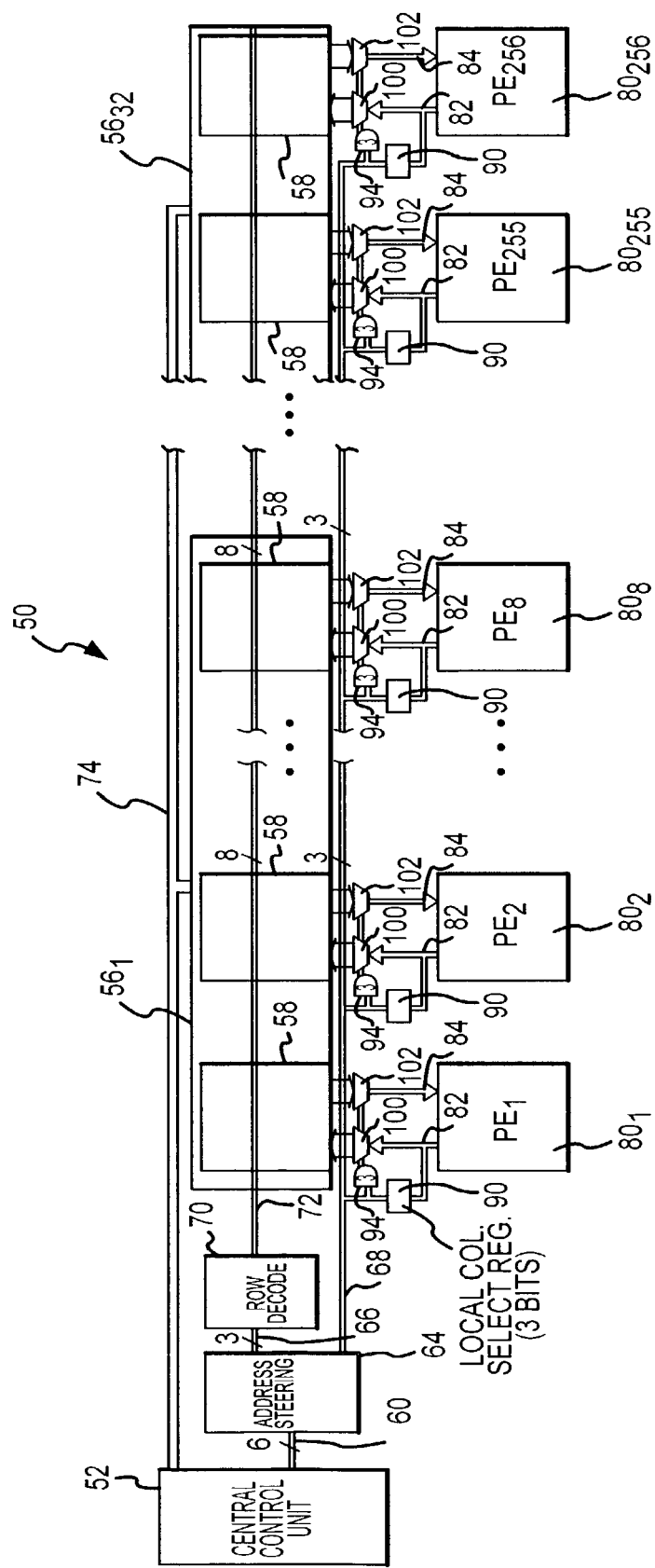
FIG. 2 is a block diagram of a SIMD computer system according to one embodiment of the invention.

A SIMD computer system 50 according to one embodiment of the invention is shown in FIG. 2. The computer system 50 includes a Central Control Unit 52, which may be a conventional central processing unit ("CPU") or microprocessor. The Central Control Unit 52 includes a data bus coupled to a data port of 32 SRAMs $56_1$–$56_{32}$. Each of the SRAMs 56 includes 8 SRAM arrays 58, each of which has 8 rows and 8 columns. Each column has 8 memory locations and can therefore store 8 bits. The Central Control Unit 52 also includes a 6-bit address bus 60 coupled to an address steering unit 64. The address steering unit selects certain bits of the 6-bit address to create a row address applied to a row address bus 66, and the remaining bits of the 6-bit address are used to create a column address that is applied to a column address bus 68. The row address bus 66 is coupled to a row decoder 70 that provides row select signals on a row select bus 72. As is well known in the art, the row select signals activate respective rows in the SRAMs 56 corresponding to the row address applied to the row decoder 70 by the address steering unit 64. The Central Control Unit 52 also includes a data bus 74 that is coupled to a respective data port of each SRAM 56. The Central Control Unit 52 also includes a number of signal lines (not shown) that are coupled to the SRAMs 62, but these have been omitted from FIG. 2 in the interest of clarity and brevity.

As explained in greater detail below, the address steering unit 64 selects bits from the 6-bit address for a row address and a column address to load data and instructions into, and read data from, the SRAMs 56 in a several different formats. For example, by properly selecting bits to create a row address and a column address, 32-bit data word can be loaded into memory cells in the SRAM 56 in a single column spanning 4 rows.

With further reference to FIG. 2, the computer system 50 includes 256 processing elements ("PEs") $80_1$–$80_{256}$. Groups of 8 PEs $80_1$–$80_8$ . . . $80_{249}$–$80_{256}$ are coupled through respective write data buses 82 and read data buses 84 to respective SRAMs $56_1$ . . . $56_{32}$. For example, the PEs $80_1$–$80_8$ are coupled to the SRAM $56_1$, as shown in FIG. 2. Each PE 80 is coupled to a respective one of the memory cell arrays 58. As mentioned above, each array 58 includes memory cells arranged in 8 rows and 8 columns, each of which stores 8 bits. Thus, since 8 arrays 58 are included in each SRAM 56, each SRAM 56 stores 4096 bits of data, and each PE 80 can access 512 bits of data in its respective 8 columns of its array 58.

Figure 1:
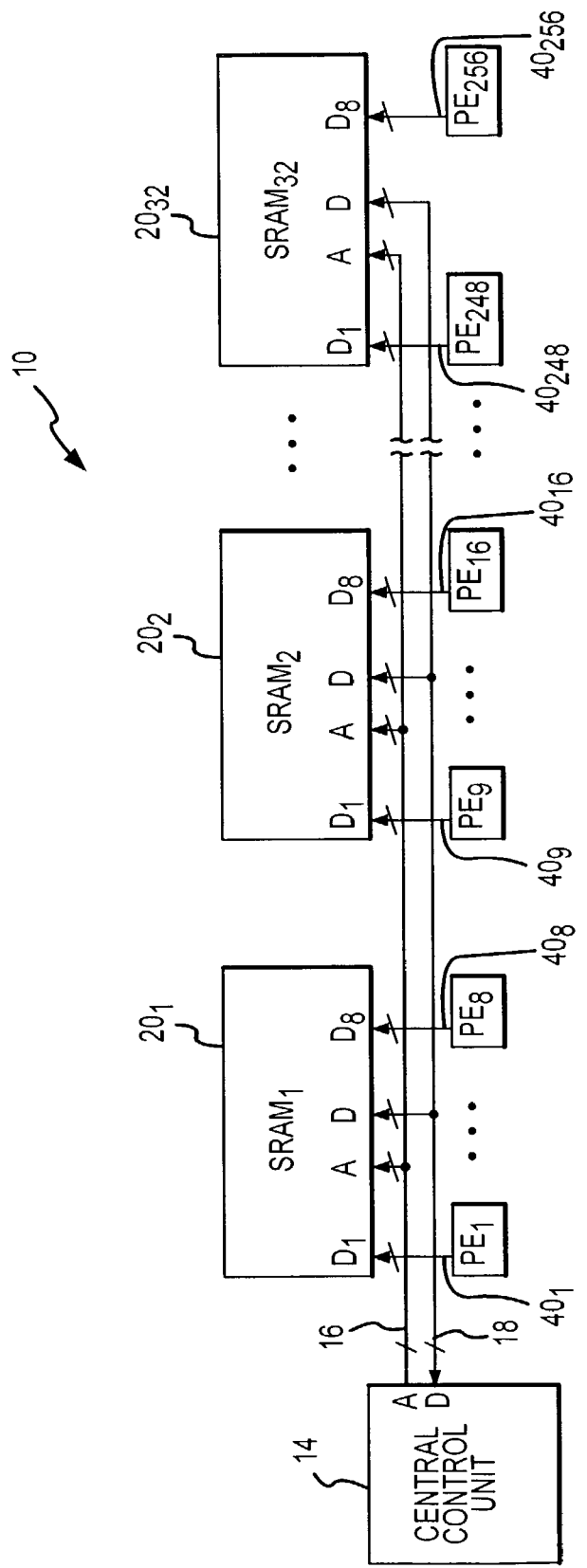
FIG. 1 is a block diagram of a conventional SIMD computer system.

Unlike the conventional SIMD computer system 10 shown in FIG. 1, the PEs 80 in the SIMD computer system 50 of FIG. 2 can locally provide column addresses to its respective array 58, although row addresses are provided globally by the Central Control Unit 52. More specifically, the write data bus 82 of each PE $80_1$–$80_{256}$ is coupled to a respective local column address register $90_1$–$90_{256}$ that stores a 3-bit local column address provided by its respective PE $80_1$–$80_{256}$. Each local column address register $90_1$–$90_{256}$ provides its 3-bit column address to one input of an AND gate 94 provided for each bit of the column address. A second input of the AND gate 94 provided for each bit is coupled to the column address bus 68. The outputs of the AND gates 94 are coupled to control inputs of a write data multiplexer 100 and a read data multiplexer 102. The multiplexers 100, 102 decode the received column address and then couple a corresponding one of 8 columns of memory cells (i.e., a set of 8 digit lines) in its respective array 58 to the write data bus 82 and read data bus 84 of its respective PE 80. The specific column of memory cells coupled to the write data bus 82 and read data bus 84 is selected by the column address at the output of the AND gates 94. As explained below, the AND gates 94 either couple the global column address bus 68 to the multiplexers 100, 102 to allow the Central Control Unit to provide column addresses to the SRAMs 56 or couple each write data bus 82 to the multiplexers 100, 102 to allow the PEs 80 to provide column addresses to the SRAMs 56. As a result, each PE 80 can locally address its array 58, which serves as the register file for the PE 80. Significantly, each column address register is programmed by its respective PE 80. As a result, local addressing is provided in a manner that does not require time-consuming loading of addresses into local addresses registers from a single device, such as the Central Control Unit 52. Also, it is relatively easy to implement the embodiment of FIG. 2 because the PEs local address is passed through the PEs data port. The other circuitry associated with each PE is also naturally physically close to this data port. No long global connections are required in the SRAM, and no extra ports for the PEs address.

Whether the AND gates 94 provide either global or local addressing of the SRAM columns is determined by the logic levels applied to the AND gates 94. When the SRAMs 56 are to be addressed globally, the PE's 80 load three high logic levels into their respective local column address registers 90 so that the registers 90 provide high logic levels to the AND gates 94. The logic level at the outputs of the AND gates 94 is then controlled by the logic levels applied to the AND gates 94 by the address steering unit 64. For example, if the address steering unit 64 outputs a high logic level to one of the AND gates 94, the AND gate 94 will output a high logic level.

When the SRAMs 56 are to be addressed locally, the address steering unit 64 applies high logic levels to the AND gates 94 so that the logic levels at the outputs of the AND gates 94 are controlled by the logic levels provided by each local column address register 90. The PE's 80 each provide a local column address by outputting three column address bits on its write data bus 82, which are loaded into the column address register 90. The column address register 90 then applies the local column address to the AND gates 94, which outputs that address to the multiplexers 100, 102. The multiplexers 100, 102 then decode the received column address and select a corresponding column of memory cells in its respective array 58. Each PE 80 can therefore locally select each of 8 different columns of the SRAM 56 to write or read data.

Although the PEs 80 can locally address the SRAM 56, the PEs can only address columns of the SRAM 56. They cannot provide row addresses to the SRAM 56. Instead, for both global addressing and local addressing, the row select signals are provided by the row decoder 70. As previously mentioned, these row select signals are provided by responsive to row addresses generated by the Central Control Unit 52 through the address steering unit 64. It is therefore important for the Central Control Unit 52 to stores data in the SRAM 64 in a manner that can be easily accessed by the PEs 80. Although each PE has only 8-bit data buses 82, 84, the PE can operate on data words of 8, 16, 32, or 64 bits. A 16-bit word is formed by two 8-bit words, a 32-bit word is formed by four 8-bit words, and a 64-bit word is formed by eight 8-bit words. As explained below, the format in which the data are stored in the SRAM 64 should vary depending upon the number of bits in each word that will be accessed by the PEs 80. This storage format, known as the "granularity," is accomplished according to the following Table 1, which will be explained with reference to the embodiment of the address steering unit shown in FIG. 3.

TABLE 1

| Local Granularity | Word Size (bits) | Row Addr. Bits | Col. Addr. Bits |
| --- | --- | --- | --- |
| 1 | 8 | 5, 4, 3 | 2, 1, 0 |
| 2 | 16 | 5, 4, 0 | 3, 2, 1 |
| 4 | 32 | 5, 1, 0 | 4, 3, 2 |
| 8 | 64 | 2, 1, 0 | 5, 4, 3 |

Figure 3:
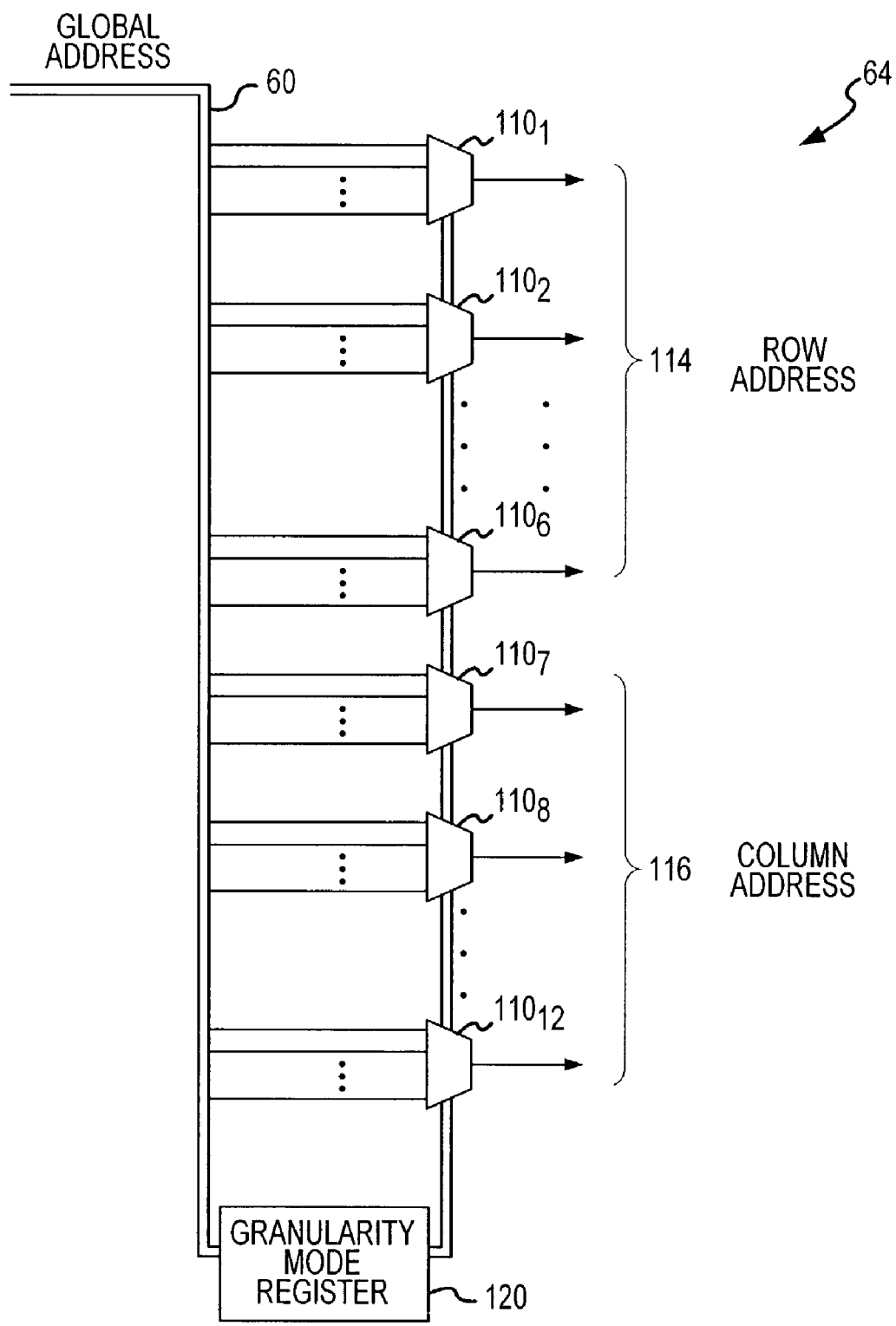
FIG. 3 is a block diagram and schematic of an address steering unit that is used in the SIMD computer system of FIG. 2.

With reference to FIG. 3, one embodiment of the address steering unit 64 includes a plurality of multiplexers $110_1$–$110_{12}$ each of which receives the 6 address bits from the Central Control Unit 52 through the address bus 60. The multiplexers 110 are divided into two groups, a set of row address multiplexers 114 and a set of column address multiplexers 116. The row address multiplexers 114 select bits from the address bus for use as row addresses, which are applied to the row address bus 66, and the column address multiplexers 116 select bits from the address bus for use as column addresses, which are applied to the column address bus 68. It can be seen from Table 1 that any of address bits 0–5 can be selected for use as either a row address or a column address. Therefore, 12 multiplexers $110_1$–$110_{12}$ are provided, 6 of which are row address multiplexers 114 and 6 of which are column address multiplexers 116.

With further reference to FIG. 3, the operation of the multiplexers 110 is controlled by a granularity mode register 120 that is programmed to a specific granularity mode by the 6 bit address on the address bus 60 when the register 120 is placed into a programming mode by suitable means. The granularity mode register 120 uses conventional logic gates to implement the address steering functions shown in Table 1. More specifically, when the granularity mode register 120 is programmed to a local granularity of 1, the row address multiplexers 114 select bits 5,4,3 from the address bus 60 for use as row addresses, and the column address multiplexers 116 select bits 2,1,0 from the address bus 60 for use as column addresses. When the granularity mode register 120 is programmed to a local granularity of 2, the row address multiplexers 114 select bits 5,4,0 for use as row addresses, and the column address multiplexers 116 select bits 3,2,1 for use as column addresses. Similarly, when the granularity mode register 120 is programmed to a local granularity of 4, the row address multiplexers 114 select bits 5,1,0 from the address bus 60 for use as row addresses, and the column address multiplexers 116 select bits 4,3,2 from the address bus 60 for use as column addresses. Finally, when the granularity mode register 120 is programmed to a local granularity of 8, the row address multiplexers 114 select bits 2,1,0 for use as row addresses, and the column address multiplexers 116 select bits 5,4,3 for use as column addresses.

The effect of steering the 6 address bits on the address bus 60 as described above will now be explained with references to FIGS. 4A and B, which shows two different arrangements in which sequentially ordered addresses are selected by the row addresses and column addresses for different granularities. The sequentially ordered addresses are shown schematically in FIGS. 4A and 4B from the lowest order address "000000" at the top to the highest order addresses "111111" at the bottom.

Figure 4A:
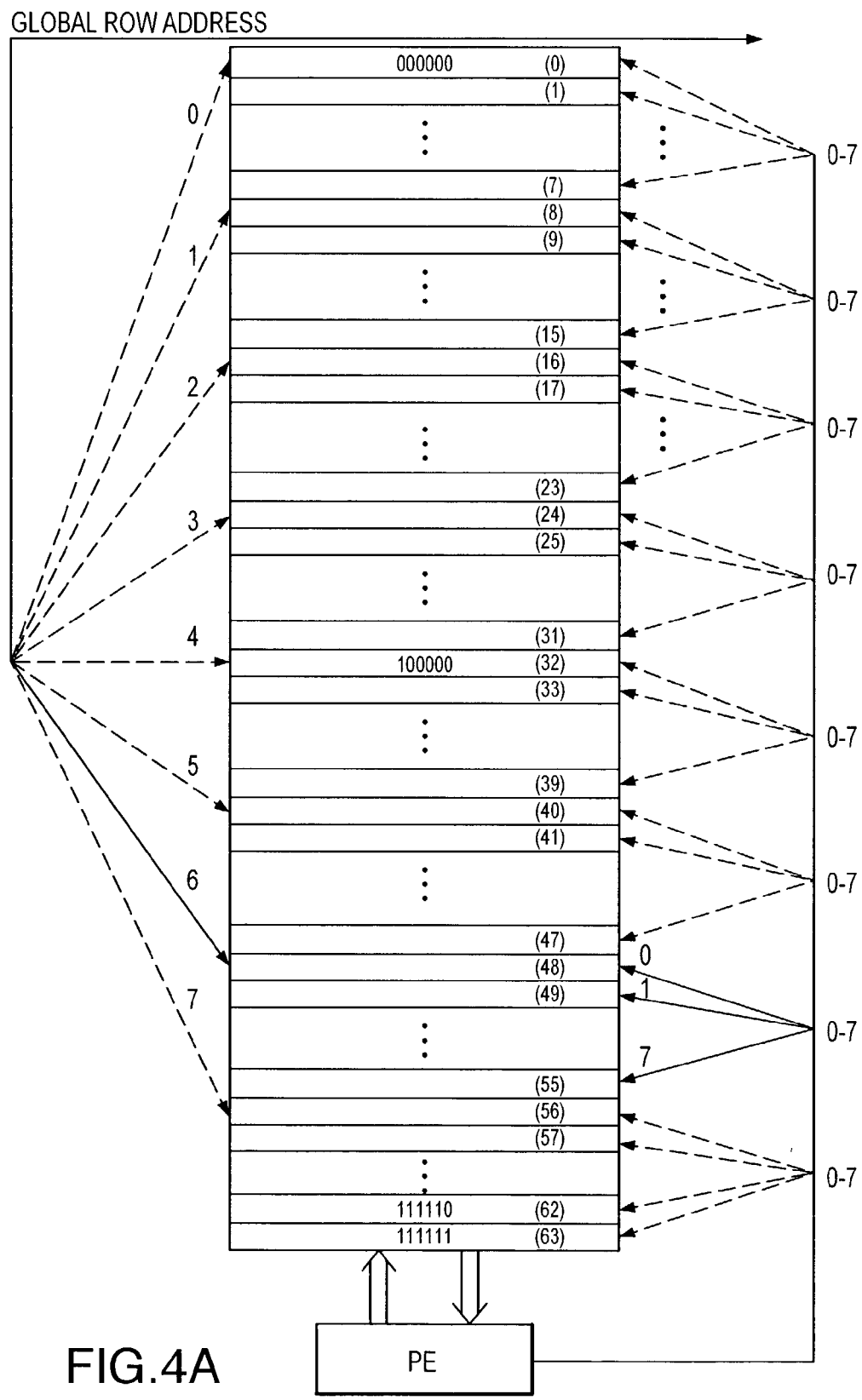
FIGS. 4A and 4b are schematic diagrams showing two different modes in which data can be stored and accessed in the SIMD computer system of FIG. 2.

As shown if FIG. 4A, selecting bits 5,4,3 for use as a row address and bits 2,1,0 for use as a column address provides a granularity of 1, allows the row address to activate rows of memory that are eight memory addresses apart from each other. The column address then selects a column to read an 8-bit word from or write an 8-bit word to in the active row. As a result, when the Central Control Unit 52 writes an 8-bit word (i.e., 1 byte of data) into the memory cell array 58 (FIG. 2) for one of the PEs 80, the data will be stored in a single column of the array 58 within a single row. When the PE 80 accesses the 8-bit word, the Central Control Unit 52 will, of course, control when the word is available to the PE 80 by activating the row in which it is stored. But the PE 80, by generating a local column address, can determine from which column the byte is accessed. Thus, although all of the PEs 80 are operating together as a SIMD computer system, each PE can write data to and read data from different locations in the SRAM 56 depending, for example, on the results of an operation by each PE 80.

Figure 4B:
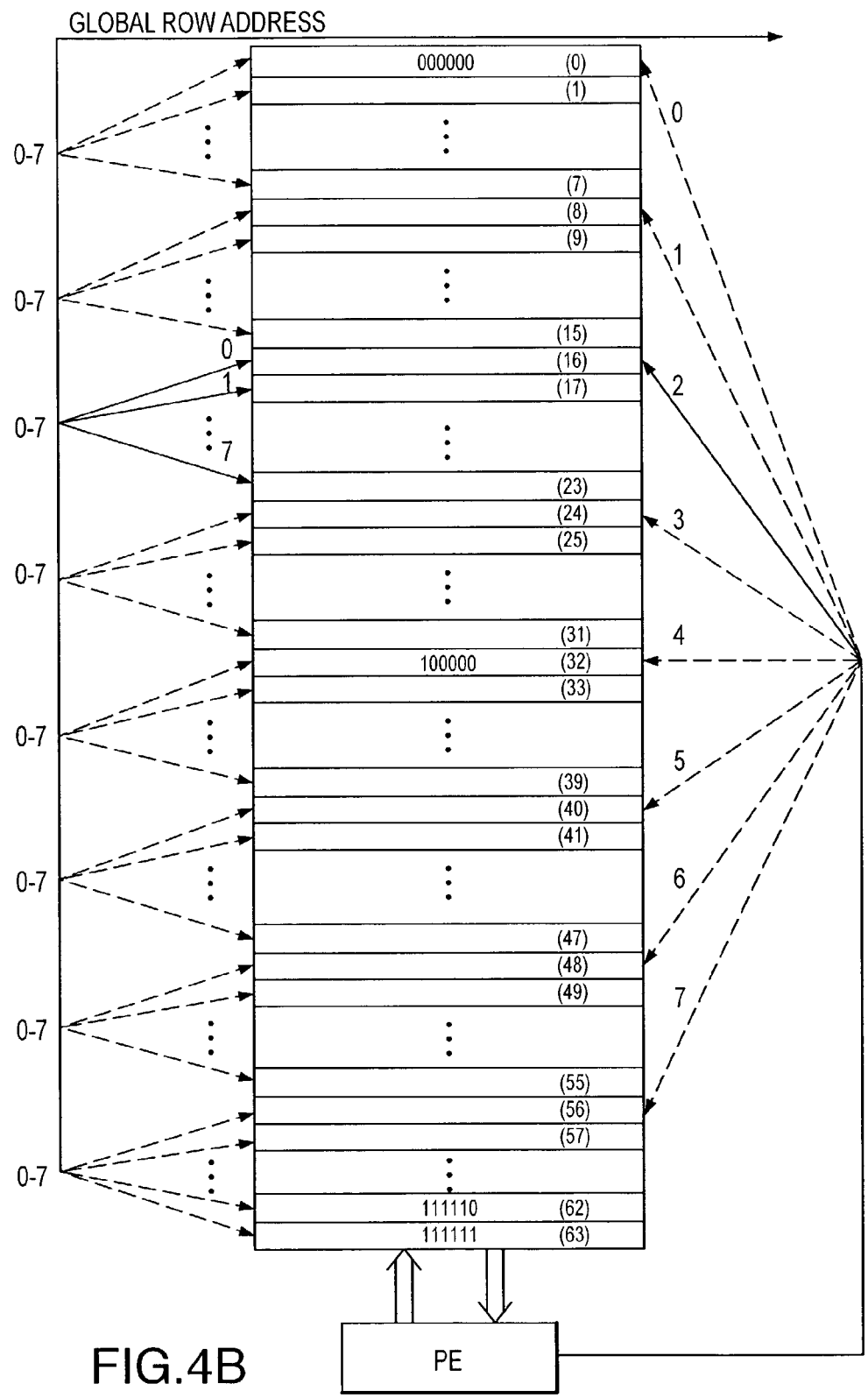

As shown in FIG. 4B, with a granularity of 8, bits 2,1,0 are selected for use as row addresses and bits 5,4,3 are selected for use as column addresses, as shown in FIG. 4B. As a result, the column address can select memory addresses that are 8 memory addresses apart from each other. The row address then activates one row within each group of eight memory addresses selected by the column address. As a result, a 64-bit word (i.e., 8 bytes of data) will be stored in a single column of the array 58 spanning eight rows. The PE 80, by generating a local column address, can again determine from which column the eight bytes are accessed.

Although not shown in the Figures, bits 5,4,0 can be selected for use as a row address and bits 3,2,1 can be selected for use as a column address to provide a granularity of 2, as shown in Table 1. A granularity of 2 allows the column address to select columns of memory that are two memory addresses apart from each other. The row address then activates one row within each group of two memory addresses selected by the column address. As a result, when the Central Control Unit 52 writes a 16-bit word (i.e., 2 bytes of data) into the memory cell array 58 for one of the PEs 80, the data will be stored in a single column of the array 58 spanning two rows. When the PE 80 accesses the 16-bit word, the Central Control Unit 52 will control when each byte of the 16-bit word is available to the PE 80. But the PE 80, by generating a local column address, can determine from which column the 2 bytes are accessed.

Finally, selecting bits 5,1,0 for use as a row address and bits 4,3,2 for use as a column address provides a granularity of 4, as also indicated in Table 1. A granularity of 4 allows the column address to select four columns of memory that are four memory addresses apart from each other. The row address then activates one row within each group of four memory addresses selected by the column address. As a result, when the Central Control Unit 52 writes a 32-bit word (i.e., 4 bytes of data) into the memory cell array 58, the data will be stored in a single column of the array 58 spanning four rows. When the PE 80 accesses the 32-bit word, the Central Control Unit 52 will again control when each byte of the 4-byte word is available, but the PE 80, by generating a local column address, can determine from which column each byte is accessed.

The SIMD computer system 50 shown in FIG. 2 thus provides local addressing in a manner that provides a great deal of flexibility. Furthermore, each PE can generate its own local address, thereby avoiding time-consuming loading of local address registers from a single device.

From the foregoing it will be appreciated that, although specific embodiments of the invention have been described herein for purposes of illustration, various modifications may be made without deviating from the spirit and scope of the invention. For example, although each local column address register 90 stores a column address that is decoded by the multiplexers 100, 102, it will be understood that the multiplexers 100, 102 could alternatively receive column select signals that would select a specific column without the need to decode a column address. In such case, the Central Control Unit 52 and the PEs 80 would generate the column select signals from a column address, and a local column select register (not shown) would be used to store local column select signals instead of using the local column address register 90 to store local column addresses. Also, although the SIMD computer system shown in FIG. 2 uses 256 PEs, eight of which share each SRAM and each of which can access a respective group of 8 columns, it will be understood that SIMD computer systems in accordance with the invention may have other architectures. For example, a greater or lesser number of PEs may be included in the system, and each memory device, which may be a SRAM or some other memory device, may be accessed by a greater or lesser number of PEs. As another example, each PE may access a respective group having a greater or lesser number of columns. Other modifications will be apparent to one skilled in the art. Accordingly, the invention is not limited except as by the appended claims.

The invention claimed is:

1. A single instruction, multiple data computer system, comprising:
    a central control unit having an address bus, the central control unit applying global column information corresponding to a respective column address to the address bus;
    at least one memory device having a column selection port and an array of memory locations arranged in rows and columns;
    a plurality of processing elements each having a data bus coupled to the at least one memory device, each of the processing elements being coupled to memory cells in a respective group of columns of the array;
    a plurality of local column registers each having an input port coupled to the data bus of a respective processing element to receive and store local column information corresponding to a local column address, each of the local column registers further having an output port; and
    a plurality of selection devices each of which is coupled to the address bus of the central control unit and to the output port of a respective local column register, each of the selection devices being operable to couple the global column information to the column selection port of the at least one memory device in a global addressing mode, and to couple the local column information to the column selection port of the at least one memory device in a local addressing mode, the local column information coupled to the column selection port being generated without the use of any of the global column information.

2. The single instruction, multiple data computer system of claim 1 wherein the at least one memory device comprises at least one random access memory.

3. The single instruction, multiple data computer system of claim 2 wherein the at least one random access memory comprises at least one static random access memory.

4. The single instruction, multiple data computer system of claim 1 wherein the data bus of each of the processing elements comprises:
    a write data bus coupling write data from the processing element to the at least one memory device; and
    a read data bus coupling read data from the at least one memory device to the processing element.

5. The single instruction, multiple data computer system of claim 1 wherein the local column information received and stored by each local column register comprises local column addresses.

6. The single instruction, multiple data computer system of claim 1 wherein each of the selection devices comprises a logic gate.

7. The single instruction, multiple data computer system of claim 1 wherein the logic gate comprises an AND gate.

8. The single instruction, multiple data computer system of claim 1, further comprising an address steering unit coupled to the address bus of the central control unit, the address steering unit being operable to generate a row address and the respective column address from a plurality of address bits received from the address bus, the address bits selected by the address steering unit to generate the row address and the respective column address being a function of the number of bits in each word stored in the at least one memory device that are accessed by each of the processing elements.

9. The single instruction, multiple data computer system of claim 8 wherein the plurality of address bits comprises 6 address bits, and wherein the address steering unit is operable to generate the row address from address bits 5, 4 and 3 and the respective column address from address bits 2, 1 and 0 responsive to 8 bits being in each word stored in the at least one memory device that are accessed by each of the processing elements.

10. The single instruction, multiple data computer system of claim 8 wherein the respective column address comprises 6 address bits, and wherein the address steering unit is operable to generate the row address from address bits 5, 4 and 0 and the respective column address from address bits 3, 2 and 1 responsive to 16 bits being in each word stored in the at least one memory device that are accessed by each of the processing elements.

11. The single instruction, multiple data computer system of claim 8 wherein the respective column address comprises 6 address bits, and wherein the address steering unit is operable to generate the row address from address bits 5, 1 and 0 and the respective column address from address bits 4, 3 and 2 responsive to 32 bits being in each word stored in the at least one memory device that are accessed by each of the processing elements.

12. The single instruction, multiple data computer system of claim 8 wherein the respective column address comprises 6 address bits, and wherein the address steering unit is operable to generate the row address from address bits 2, 1 and 0 and the respective column address from address bits 5, 4 and 3 responsive to 64 bits being in each word stored in the at least one memory device that are accessed by each of the processing elements.

13. The single instruction, multiple data computer system of claim 8, further comprising a row decoder coupled to the address steering unit to receive the row address, the row decoder generating row select signals that are applied to the at least one memory device.

14. The single instruction, multiple data computer system of claim 8 wherein the address steering unit is coupled to the selection devices to apply the respective column address to the selection devices.

15. A processing element sub-system for use in a single instruction, multiple data computer system, comprising:
   a processing element having a data bus;
   a local column register having an input port coupled to the data bus of the processing element to receive and store local column information corresponding to a local column address, the local column register further having an output port; and
   a selection device operable to couple to a column address output port either global column information in a global addressing mode or the local column information from the local column register in a local addressing mode, the local column information coupled to the column address output port being generated without the use of any of the global column information.

16. The processing element sub-system of claim 15 wherein the data bus of the processing element comprises:
   a write data bus coupling write data from the processing element; and
   a read data bus coupling read data to the processing element.

17. The processing element sub-system of claim 15 wherein the local column information received and stored by the local column register comprises local column addresses.

18. The single instruction, multiple data computer system of claim 15 wherein the selection device comprises a logic gate.

19. The single instruction, multiple data computer system of claim 18 wherein the logic gate comprises an AND gate.

20. In a single instruction, multiple data computer system, a method of addressing a memory device coupled to respective data buses of a plurality of processing elements, each of the processing elements accessing memory locations in a respective group of columns of the memory device, the method comprising:
   storing respective local column addresses generated by each of the processing elements;
   in a global addressing mode, selecting a column of memory cells in each group for access by the respective processing element using a global column address for all of the processing elements; and
   in a local addressing mode, selecting a column of memory cells in each group for access by the respective processing element using the stored local column address, without using the global column address.

21. The method of claim 20, further comprising the act of generating the column address and a row address for all of the processing elements, and wherein the acts of generating the row address and the global column address comprise generating the row address and the global column address as a function of the number of bits in data words accessed by the processing elements from the memory device.

22. The method of claim 21 wherein the address bits comprise address bits 5, 4, 3, 2, 1 and 0, and wherein the act of generating the row address and the global column address comprises generating a 3-bit row address and a 3-bit global column address.

23. The method of claim 22 wherein the act of generating the row address and the global column address as a function of the number of bits in data words accessed by the processing elements from the memory device comprises generating the row address from address bits 5, 4 and 3 and the global column address from address bits 2, 1 and 0 responsive to 8-bit data words being accessed by the processing elements.

24. The method of claim 22 wherein the act of generating the row address and the global column address as a function of the number of bits in data words accessed by the processing elements from the memory device comprises generating the row address from address bits 5, 4 and 0 and the global column address from address bits 3, 2 and 1 responsive to 16-bit data words being accessed by the processing elements.

25. The method of claim 22 wherein the act of generating the row address and the global column address as a function of the number of bits in data words accessed by the processing elements from the memory device comprises generating the row address from address bits 5, 1 and 0 and the global column address from address bits 4, 3 and 2 responsive to 32-bit data words being accessed by the processing elements.

26. The method of claim 22 wherein the act of generating the row address and the global column address as a function of the number of bits in data words accessed by the processing elements from the memory device comprises generating the row address from address bits 2, 1 and 0 and the global column address from address bits 5, 4 and 3 responsive to 64-bit data words being accessed by the processing elements.

* * * * *